United States Patent
Scarasso et al.

(10) Patent No.: US 9,761,222 B1
(45) Date of Patent: Sep. 12, 2017

(54) INTELLIGENT CONVERSATIONAL MESSAGING

(71) Applicants: Albert Scarasso, Austin, TX (US); Enzo Alda, Bethani, CT (US)

(72) Inventors: Albert Scarasso, Austin, TX (US); Enzo Alda, Bethani, CT (US)

(73) Assignee: Albert Scarasso, Austin, TX (US)

( * ) Notice: Subject to any disclaimer, the term of this patent is extended or adjusted under 35 U.S.C. 154(b) by 0 days.

(21) Appl. No.: 14/736,140

(22) Filed: Jun. 10, 2015

Related U.S. Application Data

(60) Provisional application No. 62/010,936, filed on Jun. 11, 2014.

(51) Int. Cl.

| | |
|---|---|
| *G10L 15/00* | (2013.01) |
| *G10L 15/07* | (2013.01) |
| *G10L 15/04* | (2013.01) |
| *G10L 15/22* | (2006.01) |
| G10L 21/00 | (2013.01) |
| G06F 17/27 | (2006.01) |
| G06F 7/00 | (2006.01) |
| G09B 19/00 | (2006.01) |
| G06F 17/00 | (2006.01) |
| G06F 11/00 | (2006.01) |
| G06F 21/00 | (2013.01) |
| G06F 3/048 | (2013.01) |

(Continued)

(52) U.S. Cl.
CPC .............. *G10L 15/07* (2013.01); *G10L 15/04* (2013.01); *G10L 15/22* (2013.01); *G10L 2015/223* (2013.01)

(58) Field of Classification Search
USPC .......... 704/240, 257, 258, 270, 201, 236, 9; 707/769, 694, 737; 726/1, 26, 23; 705/35; 715/706; 706/47, 46; 434/236; 709/219; 711/147
See application file for complete search history.

(56) References Cited

U.S. PATENT DOCUMENTS

| | | | |
|---|---|---|---|
| 7,912,705 B2 * | 3/2011 | Wasson ................. | G06F 17/241 704/9 |
| 7,949,728 B2 * | 5/2011 | Rivette ............. | G06F 17/30011 709/203 |

(Continued)

*Primary Examiner* — Neeraj Sharma
(74) *Attorney, Agent, or Firm* — Workman Nydegger

(57) ABSTRACT

A system for implementing a computer-based assistance in a conversation can comprise determining an identification indication associated with a first participant in a conversation. The system can also comprise accessing, within a database, user information associated with the identification indication. The user information can comprise data relating to the first participant. Based upon the user information and one or more words communicated in the conversation, the system can include calculating one or more probabilities that the conversation is associated with one or more respective conversation types. Based upon a determined conversation type, the system can activate an expert agent in the conversation. The expert agent can comprise a virtual conversation participant that is associated with a goal. The system can also comprise executing a sequential lists of actions that are associated with the goal, wherein the list of actions comprises interactions with the first participant.

20 Claims, 5 Drawing Sheets

(51) Int. Cl.
*G06F 15/16* (2006.01)
*G06F 13/00* (2006.01)

(56) References Cited

U.S. PATENT DOCUMENTS

| | | | | |
|---|---|---|---|---|
| 8,024,772 | B1* | 9/2011 | Yehuda | H04L 41/069 726/1 |
| 8,600,747 | B2* | 12/2013 | Abella | G10L 15/22 379/88.03 |
| 8,688,448 | B2* | 4/2014 | Peters | G06F 17/27 704/236 |
| 9,053,146 | B1* | 6/2015 | Kapoor | G06F 17/30386 |
| 9,298,693 | B2* | 3/2016 | Xu | G06F 17/2282 |
| 9,576,574 | B2* | 2/2017 | van Os | G10L 15/22 |
| 2002/0099633 | A1* | 7/2002 | Bray | G06F 17/211 705/35 |
| 2002/0198717 | A1* | 12/2002 | Oudeyer | G10L 13/00 704/270 |
| 2004/0075677 | A1* | 4/2004 | Loyall | G10L 13/00 715/706 |
| 2007/0003914 | A1* | 1/2007 | Yang | G06F 9/4446 434/236 |
| 2008/0222070 | A1* | 9/2008 | Damodharan | G06F 11/2257 706/47 |
| 2008/0244195 | A1* | 10/2008 | Sistla | G06F 12/0831 711/147 |
| 2009/0018835 | A1* | 1/2009 | Cooper | H04M 3/527 704/257 |
| 2009/0254971 | A1* | 10/2009 | Herz | G06Q 10/10 726/1 |
| 2010/0082513 | A1* | 4/2010 | Liu | H04L 63/1458 706/46 |
| 2011/0016123 | A1* | 1/2011 | Pandey | G06F 17/30348 707/737 |
| 2015/0006492 | A1* | 1/2015 | Wexler | G06F 17/30554 707/694 |

* cited by examiner

INTELLIGENT CONVERSATIONAL MESSAGING

CROSS-REFERENCE TO RELATED APPLICATIONS

This application claims priority to and the benefit of U.S. Provisional Application Ser. No. 62/010,936, entitled "Intelligent Conversational Messaging," filed on Jun. 11, 2014, which is incorporated herein by reference in its entirety.

BACKGROUND OF THE INVENTION

As speech recognition technology has evolved and grown more reliable in recent years, there has been an accompanying market explosion of personal digital assistants. These assistants take many different forms, including mobile phone based assistants or even organizational based assistance. In addition to the increased visibility of voice recognition functionalities, an accompanying increase to contextual and predictive artificial intelligence has also expanded in the market.

Conventional digital assistants, however, are limited to use in situations when a user activates the assistant—most often through button presses or specific verbal commands. Additionally, conventional digital assistants are limited to directly responding to a user's commands. For example, a user may request that a digital assistant schedule a meeting. Generally, conventional digital assistants are limited to performing functions defined by previously determined commands, or variations thereof.

Thus, there is a need for an intelligent conversational messaging system that can take into account the context and content of the communication and provide assistance to one or more users.

BRIEF SUMMARY OF THE INVENTION

Implementations of the present invention comprise systems, methods, and apparatus configured to generate and inject expert systems into a conversation bridge. In at least one implementation, the expert systems can be customized based upon the individual participants in the conversation and the context of the conversation. Additionally, in at least one implementation, individual expert systems can provide data to and/or request data from one or more of the individuals participating in the conversation without other participants being notified of the interaction.

In particular, implementations of the present invention comprise a system for implementing a computer-based assistant in a conversation. The system can comprise determining an identification indication associated with a first participant in a conversation. The system can also comprise accessing, within a database, user information associated with the identification indication. The user information can comprise data relating to the first participant.

Based upon the user information and one or more words communicated in the conversation, the system can include calculating one or more probabilities that the conversation is associated with one or more respective conversation types. Based upon a determined conversation type, the system can activate an expert agent in the conversation. The expert agent can comprise a virtual conversation participant that is associated with a goal. The system can also comprise executing sequential lists of actions that are associated with the goal, wherein the list of actions comprises interactions with the first participant.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above recited and other advantages and features of the invention can be obtained, a more particular description of the invention briefly described above will be rendered by reference to specific embodiments thereof, which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
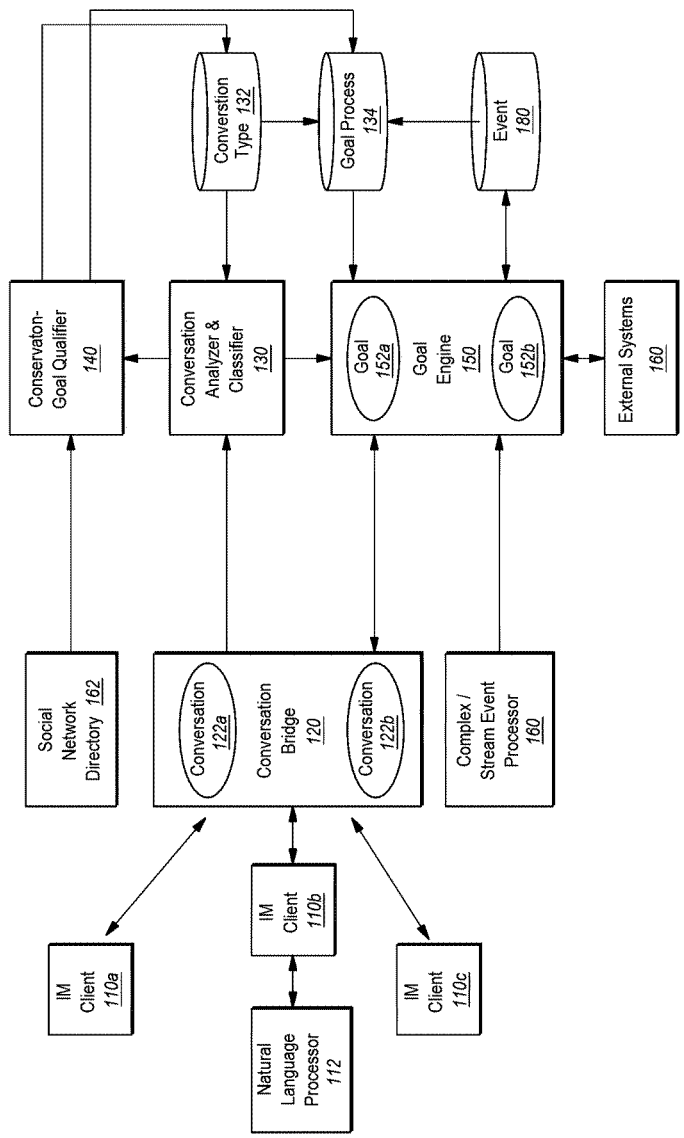
FIG. 1 depicts a schematic diagram of an intelligent conversational messaging system 100 in accordance with implementations of the present invention.

The present invention extends to systems, methods, and apparatus configured to generate and inject expert systems into a conversation bridge. In at least one implementation, the expert systems can be customized based upon the individual participants in the conversation and the context of the conversation. Additionally, in at least one implementation, individual expert systems can provide data to and/or request data from one or more of the individuals participating in the conversation without other participants being notified of the interaction.

Embodiments of the present invention can provide significant improvements and benefits to conversations occurring between two or more people. For example, in common customer support conversations, one or more expert systems can be injected into a messaging-system-based conversation bridge to gather data from the customer, provide data to the customer service representative, provide resources to the customer service representative, and perform other similar functions. Additionally, in at least one implementation, an expert system can automatically connect a third party to a conversation bridge based upon the content of the conversation. For instance, in at least one implementation, upon identifying a particular topic being raised in the conversation bridge, the expert system can automatically connect a compliance officer to the phone call to verify that compliance rules are met.

For example, in at least one implementation of the present invention, an intelligent conversation messaging system can be utilized at a financial institution. When first set-up, an individual can define conversation types, goal processes, and actions for the system to implement. As a non-limiting example, the individual may create a "new customer intake" conversation type, a "stock purchase request" conversation type, a "retirement planning" conversation type, a "customer complaint" conversation type, a "closing account conversation type," and any other number of conversation type that are of interest to a financial institution.

Along with creating the conversation types, the individual may also provide initial indications that a conversation is associated with a particular conversation type. For example, the individual may associate a call associated with a new incoming phone number as being a potential "new customer intake" conversation type, as opposed to an incoming call that is associated with a current client phone number. Similarly, the individual may associate that words "purchase," "stock," and "mutual fund" with a "stock purchase request" conversation type. As such, an individual can create a variety of different conversation types and associate a variety of different indicators with each respective conversation type.

As described more fully below, in various implementations, the intelligent conversation messaging system can track multiple aspects of a given conversation and determines probabilities relating to whether the conversation should be associated with one or more the pre-defined conversation types. For example, the intelligent conversation messaging system may identify multiple conversation types based upon the number, frequency, and groupings of various conversation type indicators. In at least one implementation, the detected patterns may indicate that multiple conversation types are occurring within the same conversation. In at least one implementation, the intelligent conversation messaging system may associate with a particular conversation multiple conversation types that are calculated as having a greater than eighty percent probability of being associated with the conversation. Additionally, in various implementations, using machine learning the intelligent conversation messaging system can adjust the indicators that are associated with each respective conversation type based upon information the system receives. For example, the system may identify the phrase "reverse mortgage" as being associated with a "retirement planning" conversation type, and add the identified phrase to a database of associated words.

In at least one implementation, once a conversation in initiated, a customer service representative, who is speaking with a customer, can be presented with a list of potential conversation types. As the conversation progresses, the system can automatically reorder the list based on probability and add or remove items from the list. At any time, the customer service representative and/or the system can select one or more of the listed conversation types to initiate an expert agent. The selection may take the form of the customer service representative interacting with a display device, selecting an option with an input device, or entering a text stream into the conversation. In the case of the text stream, the system may prevent the text from being displayed to the customer.

In addition to defining conversation types, in at least one implementation, an individual can also define goal processes that are associated with each respective conversation type. A goal process can comprise one or more collections of rules, or actions, that are desired for each conversation type. For example, a "retirement planning" conversation type may be associate with a goal of assisting a potential client with opening an IRA. The goal may comprise various rules such as—request financial information from the potential client relating to current retirement accounts, request information from the potential client relating to expected year until retirement, provide the client with specific portfolio suggestions, and other similar rules.

In various implementations, the rules can be executed by an expert agent that interacts with the potential client and/or the customer service representative. For example, the expert agent can sent a text message directly to the potential client requesting information. In various implementations, the customer service representative may not be aware that the expert agent requested the information. Once the requested information is received, the expert agent can analyze the information and provide the analyzed information, including any compliance considerations, to the customer service representative.

As the conversation progress, the expert agent can continue to gather information from communications of the customer service representative and the potential client. Additionally, the expert agent can provide stock purchase options and portfolio configuration options to the customer service representative, who can then provide them to the potential client. In at least one implementation, if the potential client already has an account with the financial institution, the expert agent can gather data from the financial institution's records and analyze the data. Based upon the analysis, the expert agent can provide additional support to the customer service representative and/or the potential client.

In at least one implementation, multiple expert agents and associated goal processes can be injected into a conversation. For example, an expert agent with a goal process of ensuring a particular aspect of compliance can be injected into a conversation as needed. For instance, the customer service representative may begin to share confidential information with the potential client. Upon detecting the confidential information, the expert agent can stop the conversation, display a warning, and/or automatically connect a compliance officer to the phone call. Specifically, the expert agent can identify the particular compliance issue being violated, lookup a compliance office with experience in that particular issue from within a database, automatically connect that compliance officer to the conversation, while providing the compliance officer with necessary background information.

Additionally, in at least one implementation, an expert agent and the associated goal processes can persist beyond the life of a conversation. For instance, the potential client and customer service representative may determine that the potential client has maxed out his annual retirement savings and that the investment of interest for the potential client is currently overpriced. As such, the potential client may request that he be contacted during the following year when the price of the investment has fallen to a certain level. In at least one implementation, an expert agent associated with "scheduling" type conversations may create an internal reminder for the customer service agent to contact the potential client when the specific events of it being a new year and the investment value dropping to a particular level are met.

As such, even when the conversation ends, the expert agent remains alive. Once the expert agent identifies that it is a new year and that the investment value has dropped, the expert agent can provide background information to the customer service representative and automatically initiate a phone call to the potential client.

Accordingly, implementations of the present invention provide a dynamic conversation type system with associated goal processes that can greatly advance the art. For example, implementations of the present invention provide for expert systems that can selectively communicate with one or more parties to a conversation and gather necessary and distinct data from each party. The expert system can then properly analyze the data and provide prompts and information to users of the system.

FIG. 1 depicts a schematic diagram of an intelligent conversational messaging system 100 in accordance with implementations of the present invention. In at least one implementation, the intelligent conversational messaging system 100 can comprise one or more instant messaging clients ('IM clients') 110(a-c). The IM clients 110(a-c) may comprise software that runs on a plurality of computing device (any device that has a processor, memory and storage) and uses a network and protocol like XMPP to connect a user or a process to a conversation bridge 120 and a particular conversation 122a, 122b instance within the conversation bridge 120. In at least one implementation, an IM client 110(a-c) can be integrated with other technologies 112 that support natural language processor capability to convert voice to text and text to voice.

The present implementation of the invention is described in reference to text messaging. One will understand, however, that this implementation is provided for the sake of example and clarity. In various alternate implementations, the invention may be implemented within a verbal communication system or any other communication system.

Additionally, in at least one implementation, the conversation bridge 120 can run in a plurality of distributed, clustered computers (processor, memory and storage) managing a plurality of a conversation instances 122a, 122b and connecting to a plurality of IM clients 110(a-c). The conversation bridge 120 can send the text, content, and parties (i.e., users) of a conversation to the Conversation Analyzer & Classifier 130. The conversation bridge 120 can also activate rules for each conversation and IM clients 110(a-c) associated with enforcing security policies, blocking, encrypting, and/or obfuscating confidential messages within a conversation.

In at least one implementation, the Conversation Analyzer & Classifier 130 runs in a plurality of distributed, clustered computers (processor, memory and storage) and analyzes the stream of text/information content of each party in the conversation to detect patterns that link the conversation to an predefined conversation type 132 and associated goal process 134 stored within one or more databases. The Conversation Analyzer & Classifier 130 may use a combination of natural language processing to create word n-grams for the different types of conversations. Additionally, the Conversation Analyzer & Classifier 130 can utilize a combination of predictive models and dynamic Bayesian neural network to estimate the relative likelihood of the possibilities of a conversation belonging to a conversation type 132. In at least one implementation, the conversation type 132 and goal process 134 are stored in repositories that contain identifiers to map a conversation to a conversation type 132 and the conversation type 132 to one or more goal processes 134 that are potentially associated with the conversation.

In at least one implementation, the Conversation Analyzer & Classifier 130 can send to the Conversation-Goal Qualifier 140 any conversation that it cannot qualify. The Conversation Analyzer & Classifier 130 can also send a list of goal processes 134 that need to be included with a conversation type 132 to the Goal Engine 150.

In at least one implementation, the Goal Engine 150 runs in a plurality of distributed and clustered computers (processor, memory and storage) and manages a plurality of goal instances 152(a, b). Each goal instance 152a can implement a goal process 134. In at least one implementation, a goal process can comprise a Rete like pattern-matching algorithm rules process that contains state nodes in which each state node contains a knowledge domain of business rules. In at least one implementation, the goal instance 152a can also comprise an expert system that defines which rules to fire based on the conversation and goal process 134. The fired rule can specify the actions to execute.

In at least one implementation, goal instance 152a joins conversation instance 122a by establishing a connection with the conversation bridge 120. Goal instance 152a can then receive events from Conversation Analyzer & Classifier 130 and Complex/Stream Event Processor 160. Goal instance 152a can query Social Network Directory 162 to identify users that are required to join a conversation and instruct the conversation bridge 120 to make the connection with the target user's IM client 110(a-c). In at least one implementation, goal instance 152a can create text messages directed to one or more IM clients 110(a-c) to engage users and request the user to provide additional data that can be contextual or the selection of a list of provided options. Goal instance 152a can wait for or be driven by external events from Complex/Stream Event Processor 160. In at least one implementation, goal instance 152a can interface with external systems 170 using a variety of methods including, but not limited to, TCP/IP, JASON, Web Services, JDBC, SMNP, and any other applicable communication method.

In at least one implementation, the Conversation-Goal Qualifier 140 runs in a plurality of distributed and clustered computers (processor, memory and storage) to receive conversation's messages (text and content) from IM clients 110(a-c) when the Conversation Analyzer & Classifier 130 cannot map the conversation to one or more conversation types. The Conversation-Goal Qualifier 140 may use deep learning neural network algorithms designed to extract contextual patterns from the messages in the conversation, users participating in the conversation, and external events from unclassified conversation. The Conversation-Goal Qualifier 140 can also add unclassified conversations that have significant correlative attributes to a particular conversation type 132. The Conversation-Goal Qualifier 140 can enable a user to analyze the attributes of a particular conversation type 132 and develop or associate goal processes 134 to the conversation type 132. The Conversation-Goal Qualifier 140 can also access the attributes of various users by interfacing to a social network directory 162.

In at least one implementation, the Complex/Stream Event Processor 160 runs in a plurality of distributed and clustered computers (processor, memory and storage) to receive, analyze, and correlate events from external systems and forward relevant events to the goal engine 150. The Complex/Stream Event Processor 160 may comprise an event stream module and an event-processing agent (EPA) that manages different kinds of computation on events such as filtering, aggregating, and detecting event patterns and creating derivative events. The goal engine 150 can query the event repository 180 and Complex/Stream Event Processor 160 to activate goal instance 152a. For example, the goal engine 150 can identify that a prerequisite event has previously occurred by referencing the event repository 180. Similarly, the goal engine can identify that an event has just occurred within a conversation by accessing the Complex/Stream Event Processor 160.

In at least one implementation, the Social Network Directory 162 is a repository of various users and their network links that enable the conversation bridge 120 to retrieve the connection id of a user's IM client 110(a-c). The Social Network Directory 162 can also include different attributes that define the anthology of the different users in the network. For example, a user may be a customer calling in to a customer service line. In at least one implementation, the Social Network Directory 162 may comprise information relating to purchases that the customer has made, whether the customer is current on bills, previous interactions with the customer, and other similar information.

Figure 2:
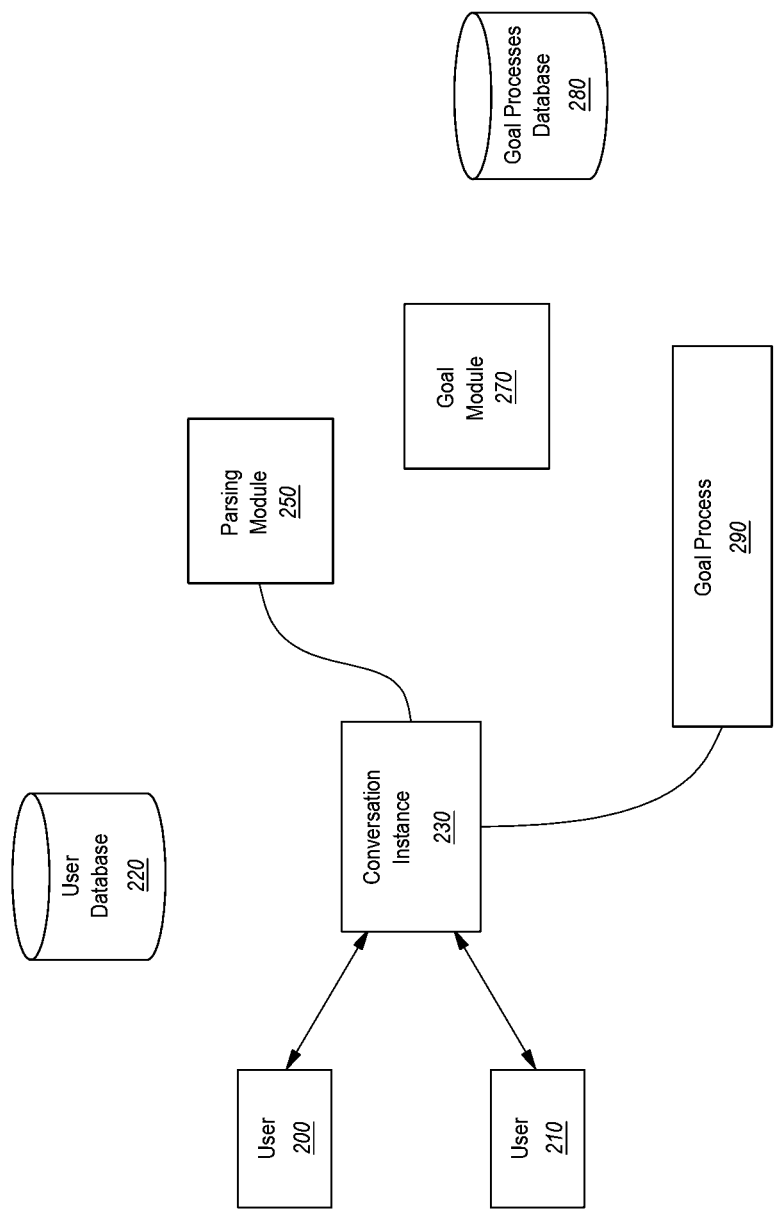
FIG. 2 depicts a schematic of data flow for analyzing the text and data content in a conversation instance between users in accordance with implementations of the present invention.

As described above, various implementations of the present invention provide a system for analyzing conversation data from a conversation bridge 120. For example, FIG. 2 illustrates a data flow for analyzing the text and data content in a conversation instance 230 between users—user 200 and user 210.

In at least one implementation, conversation instance 230 can be used to enforce conversation business rules and enforce security policies, such as, blocking, encrypting, and/or obfuscating confidential messages. For example, in at least one implementation, a conversation instance 230 can be used to encrypt financial data that is shared between users. Additionally, the conversation instance, can continuously send a conversation data to parsing module 250, which parses the text message and content. Parsing module 250 can then retrieve attributes of the users from database 220 and create a pattern of keywords and attributes data points ("Pattern").

In at least one implementation, parsing module 250 communicates the created pattern to predictive module 260. Predictive module 260 can use a predictive model to match the created pattern to one or more patterns associated with known conversation types. Predictive module 260 can then identify within a certain percentage probability that there are one or more potential conversation types. In at least one implementation, the predictive module 260 picks the conversation with the higher probability. Parsing module 250 can then receive the conversation type prediction, which parsing module 250 forwards to the goal module 270.

The goal module 270 can retrieve from a database 280 the goal processes associated with each respective conversation type. In at least one implementation, each goal process type represents a finite state network that moves through a plurality of states ($S_0$-$S_n$) to reach the goal identified with the network reaching $S_n$. Each state $S_x$ further consists of an expert agent with business rules organized in a Rete like algorithm, which fire rules, based on changes on the facts in the working memory.

From data received from the database 280, the goal module 270 can activate a new goal process 290. The goal process 290 can start by activating the business rules associated with $S_0$. For example, $S_0$ may comprise loading an expert agent associated with the goal into conversation instance 230. The expert agent may be a virtual participant in the conversation instance. In at least one implementation, text messages from expert agent to the different users may not be universally visible within the conversation bridge. As new data and content is gathered from the users (200, 210), the expert agent can move from $S_0$ to $S_{next}$.

Figure 3:
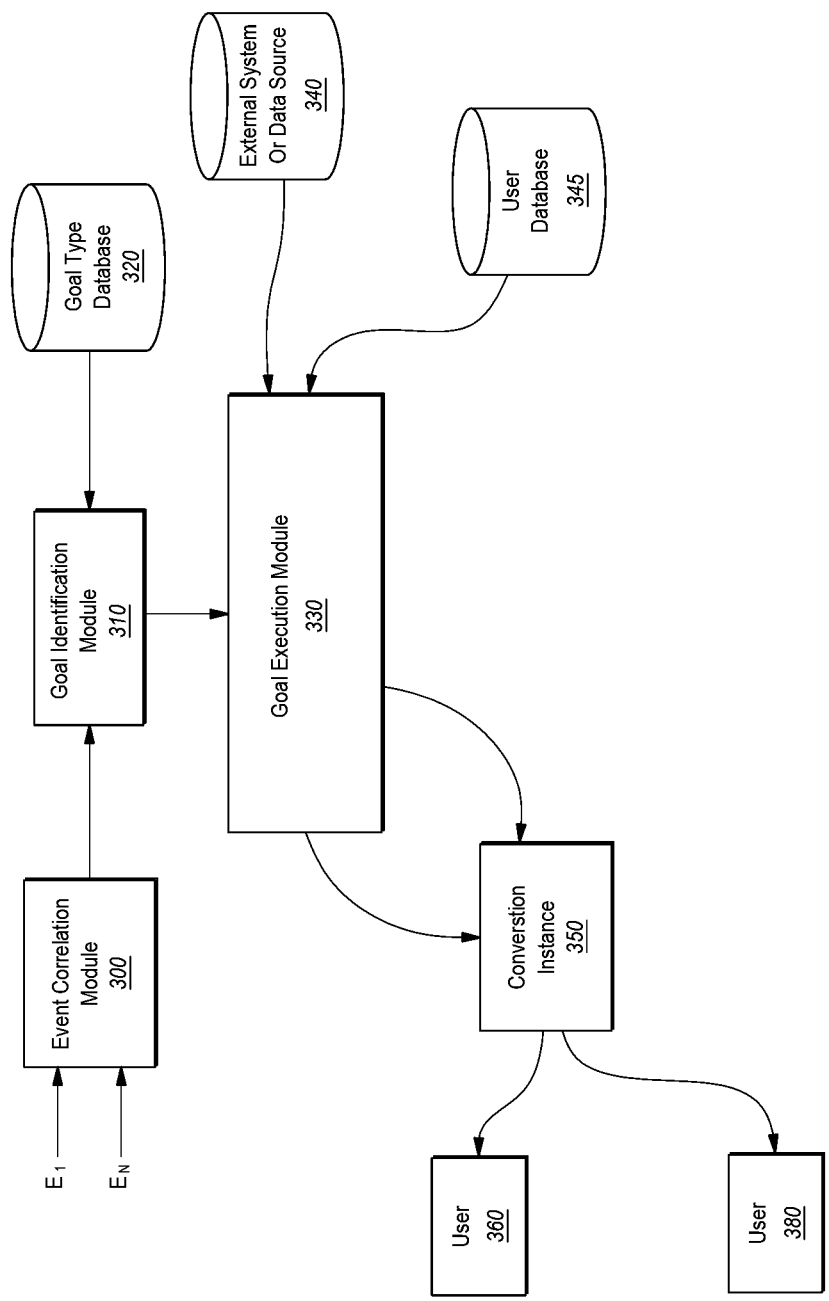
FIG. 3 depicts a schematic of an exemplary data flow in which an event triggers the activation of a goal process that connects one or more users in accordance with implementations of the present invention.

FIG. 3 illustrates a schematic of an exemplary data flow in which an event triggers the activation of a goal process that connects one or more users. For example, a first event may be related to the price of a particular stock while a second event may be related to a job market report. In at least one implementation, when the events both reach their pre-determined values, an event correlation module 300 can correlate the events. Once the events are correlated, a goal identification module 310 can associate the particular events to a particular goal. The goal may be retrieved from the database 320.

The goal identification module 310 can then initiate the particular goal. The particular goal can load the necessary data from user database 345 and from working memory. Based upon the loaded data, the particular goal can fire the business rules associated with the state $S_0$. For example, the business rules $S_0$ may comprise an action to start a conversation with a user. For instance, the goal can retrieve contact information for user 360 and user 380. The goal, through goal executing module 330, can then issue an instruction to create a new conversation instance 350, followed by an instruction to connect user 380 and user 360. In at least one implementation, the particular goal can also provide text or audio information to the respective users when the conversation is initiated. As the conversation progresses, the goal can progress through one or more states $S_n$ based upon the content of the conversation and other external data points.

Figure 4:
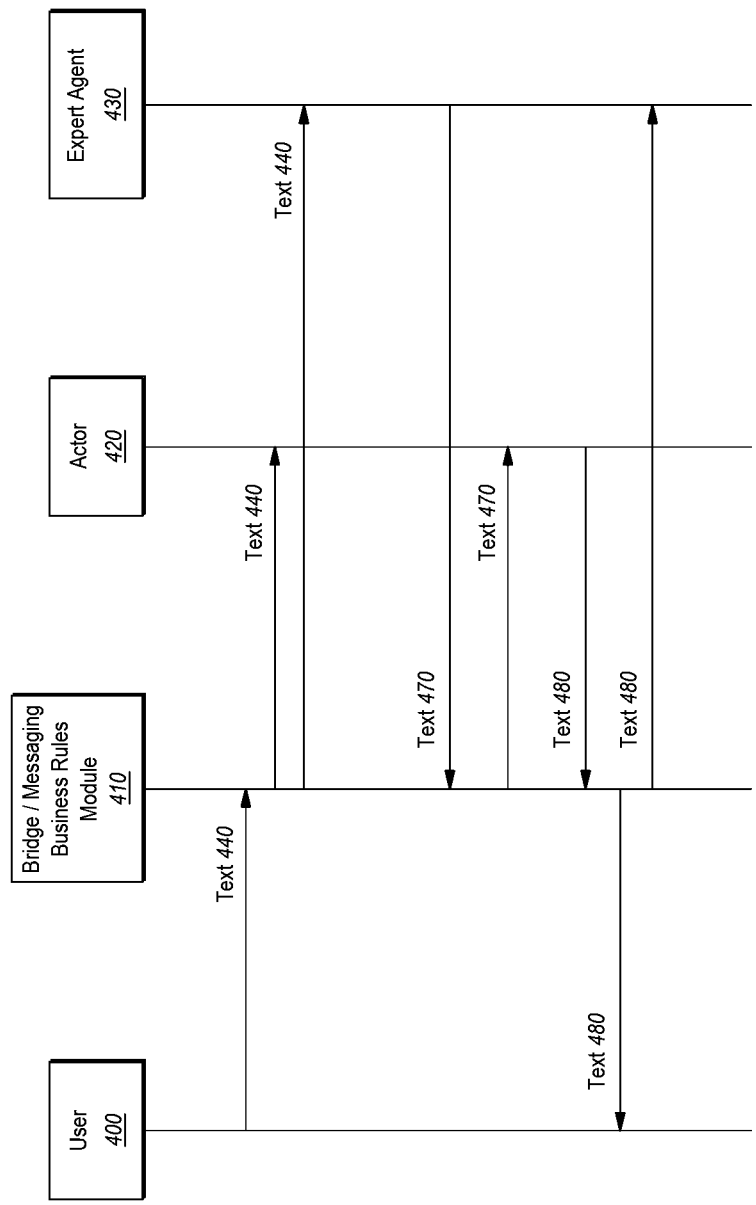
FIG. 4 depicts a schematic of an exchange of messages between three different users, including an expert agent, in accordance with implementations of the present invention.

FIG. 4 illustrates a schematic of an exchange of messages between three different users—user 400, user 420, and expert agent 430 (a virtual user). For example, user 400 can send a text 440. The text 440 is relayed into Bridge/Messaging Business rules module 410, which after evaluating the content of text 440, forwards it to user 420 and expert agent 430. In at least one implementation, expert agent 430 is in state $S_1$ (with business rules for such state in effect). A derived pattern for text 440 is entered as a fact into state $S_1$'s working memory, which causes the goal process to transition from $S_1$ to $S_2$.

In at least one implementation, state $S_2$ then fires business rules 460, which creates text 470 and forwards text 470 to the Bridge/Messaging Business rules module 410. The process business rules can then determine that only user 420 needs to receive the message text 470. In at least one implementation, user 420 can use the information in text 470 to generate a response text 480 to user 400 and the expert agent 430.

Accordingly, FIGS. 1-4 and the corresponding text illustrate or otherwise describe one or more components, modules, and/or mechanisms for automating a virtual conversation assistant. One will appreciate that implementations of the present invention can also be described in terms of methods comprising one or more acts for accomplishing a particular result. For example, FIG. 5 and the corresponding text illustrate or otherwise describe a sequence of acts in a method for automating a virtual conversation assistant. The acts of FIG. 5 are described below with reference to the components and modules illustrated in FIGS. 1-4.

Figure 5:
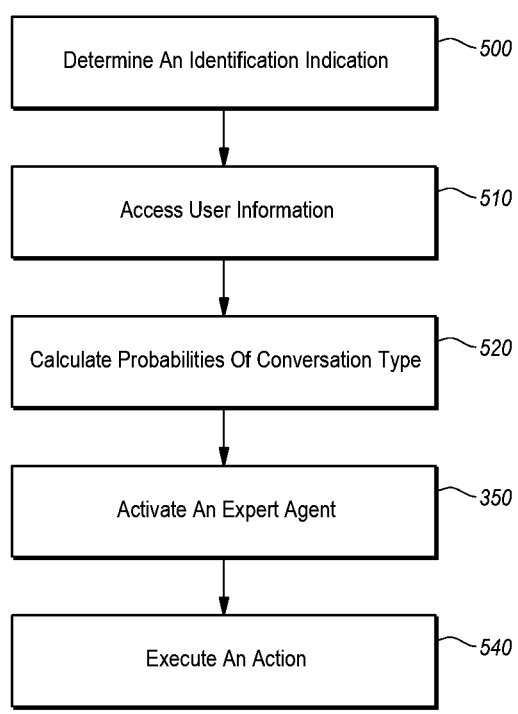
FIG. 5 depicts a flow chart of a method for automatically initiating an expert system in accordance with implementations of the present invention.

For example, FIG. 5 illustrates that a method for automating a virtual conversation assistant may include an act 500 of determining an identification indication. Act 500 includes determining an identification indication associated with a first participant in a conversation. For example, in FIG. 1 and the accompanying description, the intelligent conversational messaging system 100 can identify a phone user name, phone number, or customer name associated within an incoming message or phone call.

FIG. 5 also shows that the method may include an act 510 of accessing user information. Act 510 can comprise accessing, within a database, user information associated with the identification indication, wherein the user information comprises data relating to the first participant. For example, in FIG. 1 and the accompanying description, the intelligent conversational messaging system 100 can access a social network directory 162 to gather information relating to a conversation participant.

Additionally, FIG. 5 shows that the method may include an act 520 of calculating probabilities of conversation type. Act 520 can comprise, based upon the user information and one or more words communicated in the conversation, calculating one or more probabilities that the conversation is associated with one or more respective conversation types. For example, in FIG. 2 and the accompanying description, a predictive module 260 calculates probabilities that the conversation is of a particular type. In various implementations, the predictive module 206 may predict that the conversation should be associated with multiple conversation types.

Further, FIG. 5 shows that the method may include an act 530 of activating an expert agent. Act 530 can comprise, based upon a determined conversation type, activating an expert agent in the conversation, wherein the expert agent comprises a virtual conversation participant that is associated with a goal. For example, in FIG. 4 and the accompanying description, an expert agent 430 is activated within a particular conversation bridge. The expert agent 430 communicates with the other conversation participants in order to achieve a goal.

Further still, FIG. 5 shows that the method may include an act 540 of executing an action. Act 540 can comprise executing a sequential lists of actions that are associated with the goal, wherein the list of actions comprises interactions with the first participant. For example, in FIG. 3 and the accompanying description, a goal execution module 330 executes sequential goal actions based upon feedback and information gathered from the conversation and external sources. The information can include information directly provided by a conversation participant, information automatically parsed from the conversation, information gathered from outside databases, or any other information of interest.

Accordingly, implementations of the present invention provide significant improvements to the field of automated assistants. In particular, implementations of the present invention provide a goal/rule based approach for injecting an expert agent into a conversation. Additionally, implementations of the present invention selectively interact with participant of a conversation without necessarily interacting with every participant simultaneously.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

Embodiments of the present invention may comprise or utilize a special-purpose or general-purpose computer system that includes computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud-computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud-computing model can be composed of various characteristics, such as on-demand self-service, broad network access, resource pooling, rapid elasticity, measured service, and so forth. A cloud-computing model may also come in the form of various service models such as, for example, Software as a Service ("SaaS"), Platform as a Service ("PaaS"), and Infrastructure as a Service ("IaaS"). The cloud-computing model may also be deployed using different deployment models such as private cloud, community cloud, public cloud, hybrid cloud, and so forth.

Some embodiments, such as a cloud-computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A computer system, comprising:
one or more processors;
system memory; and
one or more computer-readable media storing computer-executable instructions that, when executed by the one or more processors, cause the computer system to implement a method for a goal-driven computer-based assistant in a conversation, the method comprising:
determining an identification indication associated with a first participant in a conversation;
accessing, within a database, user information associated with the identification indication, wherein the user information comprises data relating to the first participant;
receiving through a conversation bridge one or more words communicated from a user;
mapping the one or more words to a repository of predefined conversation types, wherein each predefined conversation type is associated with a goal process that comprises a finite state network that moves through a plurality of states to reach a particular end state that is associated with the respective predefined conversation type;
based upon the user information and the mapping of the one or more words to the predefined conversation types, calculating one or more probabilities that the conversation is associated with one or more predefined conversation types;
causing a digital display screen to display a list of suggested conversation types, wherein the list is periodically reordered based upon updates regarding probabilities that the conversation is associated with the one or more predefined conversation types;
receiving an indication that the conversation is a particular type of conversation, wherein the received indication comprises a selection of the particular type of conversation from the display list;
based upon the selected particular conversation type, activating an expert agent in the conversation, wherein the expert agent comprises a virtual conversation participant that is associated with the goal process, wherein:
each state within the plurality of states is associated with business rules; and
executing actions that are associated with the goal process, wherein the actions comprise communicating to the first participant through the conversation bridge.

2. The system as recited in claim 1, wherein the identification indication is a messaging system identification.

3. The system as recited in claim 1, wherein the expert agent communicates with one or more participants in the conversation.

4. The system as recited in claim 3, wherein the expert agent communicates with a participant in the conversation without one or more other participants being aware of the communication.

5. The system as recited in claim 1, further comprising:
requesting, through the expert agent, participant information from the first participant; and
based upon an analysis of the participant information, determining a subsequent action for the expert agent.

6. The system as recited in claim 1, further comprising:
identifying the occurrence of a particular event, wherein the particular event is associated with the goal process; and
initiating an action from the sequential list of actions based upon the occurrence of a particular event.

7. The system as recited in claim 6, wherein the particular event occurs after the conversation is completed.

8. The system as recited in claim 6, wherein the particular event comprises an equity fund reaching a particular value.

9. The system as recited in claim 1, further comprising:
identifying, with the expert agent, a particular conversation component; and
in response to the conversation component, connecting a second participant to the conversation.

10. The system as recited in claim 9, wherein the particular conversation component comprises a breach of compliance rules.

11. The system as recited in claim 9, wherein the second participant comprises a human compliance officer.

12. A computer-implemented method for automating a computer assistant within a conversation, the method comprising:
determining an identification indication associated with a first participant in a conversation;
accessing, within a database, user information associated with the identification indication, wherein the user information comprises data relating to the first participant;
receiving through a conversation bridge one or more words communicated from a user;
mapping the one or more words to a repository of predefined conversation types, wherein each predefined conversation type is associated with a goal process that comprises a finite state network that moves through a plurality of states to reach a particular end state that is associated with the respective predefined conversation type;
based upon the user information and the mapping of the one or more words to the predefined conversation types, calculating one or more probabilities that the conversation is associated with one or more predefined conversation types;
causing a digital display screen to display a list of suggested conversation types, wherein the list is periodically reordered based upon updates regarding probabilities that the conversation is associated with the one or more predefined conversation types;
receiving an indication that the conversation is a particular type of conversation, wherein the received indication comprises a selection of the particular type of conversation from the display list;
based upon the selected particular conversation type, activating an expert agent in the conversation, wherein the expert agent comprises a virtual conversation participant that is associated with the goal process, wherein:
the goal process comprises a finite state network that moves through a plurality of states to reach a particular end state, and
each state within the plurality of states is associated with business rules; and
executing actions that are associated with the goal process, wherein the actions comprise communicating to the first participant through the conversation bridge.

13. The method as recited in claim 12, wherein the expert agent communicates with one or more participants in the conversation.

14. The method as recited in claim 13, wherein the expert agent communicates with a participant in the conversation without one or more other participants being aware of the communication.

15. The method as recited in claim 12, further comprising:
requesting, through the expert agent, participant information from the first participant; and
based upon an analysis of the participant information, determining a subsequent action for the expert agent.

16. The method as recited in claim 12, further comprising:
identifying the occurrence of a particular event, wherein the particular event is associated with the goal process; and
initiating an action from the sequential list of actions based upon the occurrence of a particular event.

17. The system as recited in claim 16, wherein the particular event occurs after the conversation is completed.

18. The system as recited in claim 10, further comprising:
identifying, with the expert agent, a particular conversation component; and
in response to the conversation component, connecting a second participant to the conversation.

19. The system as recited in claim 18, wherein the particular conversation component comprises a breach of compliance rules.

20. One or more computer storage devices having stored thereon computer-executable instructions that, when executed at a processor, cause the computer system to perform a method for automating a computer assistant within a conversation, the method comprising:
determining an identification indication associated with a first participant in a conversation;
accessing, within a database, user information associated with the identification indication, wherein the user information comprises data relating to the first participant;
receiving through a conversation bridge one or more words communicated from a user;
mapping the one or more words to a repository of predefined conversation types, wherein each predefined conversation type is associated with a goal process that comprises a finite state network that moves through a plurality of states to reach a particular end state that is associated with the respective predefined conversation type;
based upon the user information and the mapping of the one or more words to the predefined conversation types, calculating one or more probabilities that the conversation is associated with one or more predefined conversation types;
causing a digital display screen to display a list of suggested conversation types, wherein the list is periodically reordered based upon updates regarding probabilities that the conversation is associated with the one or more predefined conversation types;
receiving an indication that the conversation is a particular type of conversation, wherein the received indication comprises a selection of the particular type of conversation from the display list;
based upon the selected particular conversation type, activating an expert agent in the conversation, wherein the expert agent comprises a virtual conversation participant that is associated with the goal process, wherein:
the goal process comprises a finite state network that moves through a plurality of states to reach a particular end state, and
each state within the plurality of states is associated with business rules; and
executing actions that are associated with the goal process, wherein the actions comprise communicating to the first participant through the conversation bridge.

* * * * *